(12) United States Patent
Kawakami et al.

(10) Patent No.: US 10,198,181 B2
(45) Date of Patent: Feb. 5, 2019

(54) INFORMATION RECORD/REPRODUCTION APPARATUS AND RECORD/REPRODUCTION METHOD

(71) Applicants: NEC Corporation, Tokyo (JP); NEC Space Technologies, Ltd., Tokyo (JP)

(72) Inventors: Satoko Kawakami, Fuchu (JP); Hiroki Hihara, Fuchu (JP); Kazuyo Mizushima, Minato-ku (JP); Tadayuki Takahashi, Sagamihara (JP); Motohide Kokubun, Sagamihara (JP); Masaharu Nomachi, Sagamihara (JP); Masanobu Ozaki, Sagamihara (JP); Nobuyuki Kawai, Tokyo (JP); Yoshitaka Ishisaki, Tokyo (JP); Yukikatsu Terada, Saitama (JP)

(73) Assignees: NEC Corporation, Tokyo (JP); NEC Space Technologies, Ltd., Tokyo (JP)

( * ) Notice: Subject to any disclaimer, the term of this patent is extended or adjusted under 35 U.S.C. 154(b) by 0 days.

(21) Appl. No.: 14/655,802

(22) PCT Filed: Dec. 25, 2013

(86) PCT No.: PCT/JP2013/085327
§ 371 (c)(1),
(2) Date: Jun. 26, 2015

(87) PCT Pub. No.: WO2014/104399
PCT Pub. Date: Jul. 3, 2014

(65) Prior Publication Data
US 2016/0196066 A1   Jul. 7, 2016

(30) Foreign Application Priority Data

Dec. 27, 2012 (JP) ................................ 2012-284142

(51) Int. Cl.
*G06F 3/06* (2006.01)

(52) U.S. Cl.
CPC .......... *G06F 3/0604* (2013.01); *G06F 3/0608* (2013.01); *G06F 3/0631* (2013.01);
(Continued)

(58) Field of Classification Search
CPC ................. G06F 3/0631; G06F 3/0644; G06F 12/00–12/16; G06F 3/06–3/0689
See application file for complete search history.

(56) References Cited

U.S. PATENT DOCUMENTS 7,472,238 B1 * 12/2008 Gokhale ............... G06F 3/0605
                                                                 711/112
2007/0245114 A1   10/2007 Kakui et al.
(Continued)

FOREIGN PATENT DOCUMENTS

JP   H07-281945 A   10/1995
JP   2005031929 A    2/2005
(Continued)

OTHER PUBLICATIONS

International Search Report and Written Opinion dated Mar. 28, 2014 in PCT/JP2013/085327 with partial English-language translation (7 pgs.).

(Continued)

*Primary Examiner* — Nicholas J Simonetti
(74) *Attorney, Agent, or Firm* — Foley & Lardner LLP

(57) ABSTRACT

An information record/reproduction apparatus includes logical volumes that can be used as a variable-length record/reproduction area and a physical volume that has been divided into a plurality of fixed-length areas and is not subjected to record or reproduction. Allocation to the logical volume is made by combining the divided fixed-length physical volumes by a management unit, and the size of the information storage area can be set depending upon, for example, a category of information to be recorded. If the (Continued)

amount of information of high priority exceeds a size of a predetermined logical volume corresponding to the information while no unused physical volume is available, then the management unit detaches part of a logical volume in which information of low priority has been recorded, allocates the detached part to the logical volume corresponding to the information, and thus records the exceeding amount of information.

3 Claims, 4 Drawing Sheets

(52) U.S. Cl.
CPC .......... *G06F 3/0665* (2013.01); *G06F 3/0673* (2013.01); *G06F 3/0689* (2013.01)

(56) References Cited

U.S. PATENT DOCUMENTS

2008/0247677 A1  10/2008  Yoshino
2012/0198188 A1*  8/2012  Coronado ......... G06F 17/30345
                                                711/162
2013/0007345 A1*  1/2013  Barbou-Des-Places ....................
                                                G06F 9/461
                                                711/103
2013/0067187 A1*  3/2013  Moss ................... G06F 3/0689
                                                711/170

FOREIGN PATENT DOCUMENTS

| JP | 2006053601 A | 2/2006 |
| JP | 2008-283658 A | 11/2008 |
| JP | 2009282800 A | 12/2009 |
| WO | WO 2005/076274 A1 | 8/2005 |
| WO | WO 2011/052005 A1 | 5/2011 |

OTHER PUBLICATIONS

Extended European Search Report dated Jul. 21, 2016 in related European Appl. 13866556.7 (8 pgs.).
Office Action dated Nov. 8, 2017 in related Japanese Appl. No. 2012-284142 with English-language translation (4 pgs.).

* cited by examiner

INFORMATION RECORD/REPRODUCTION APPARATUS AND RECORD/REPRODUCTION METHOD

CROSS-REFERENCE TO RELATED APPLICATIONS

This application is a national stage entry of International application no. PCT/JP2013/085327, filed Dec. 25, 2013; which claims priority to Japanese application no. 2012-284142, filed Dec. 27, 2012; the contents of both of which are incorporated by reference herein in their entirety.

TECHNICAL FIELD

The present invention relates to an information record/reproduction apparatus and an information record/reproduction method.

BACKGROUND ART

In an information record/reproduction apparatus provided in an artificial satellite, it is customary to divide all storage area into areas each having a physically fixed size and to record information of the same priority into each of the areas. Therefore, even if information is of a high priority, it cannot be recorded with a size greater than the size of an area into which the information is to be recorded. On the other hand, if information of a low priority has a size less than initially expected, a free space is present in an area into which the information is to be recorded. However, such a free storage area cannot be used effectively.

Additionally, there is another problem that, even if information of a high priority has a size that is greater than initially expected and exceeds the size of an area into which the information is to be recorded, such information of a high priority cannot newly be recorded into an area that has stored information of a low priority that does not need to be reproduced.

Specific examples will be described below.

An information record/reproduction apparatus in an artificial satellite is used to reproduce information from the information record/reproduction apparatus in the order of the priority and to transmit the information in its intended order of the priority.

FIG. 4 illustrates an example of a recording scheme of a volume group 10 in an existing information record/reproduction apparatus provided in a scientific satellite. With this recording scheme, all storage areas are managed as a physical medium of a physical volume 40 by a memory manager 20. Physical extents 50 (#00, #01, . . . , #XX) are allocated as fixed-size storage areas to respective categories of information to be recorded. Specifically, each of the physical extents 50 (#00, #01, . . . , #XX) includes one or more blocks 60. The number of the blocks is predetermined.

PRIOR ART LITERATURE

Patent Literature

Patent Literature 1: WO 2005/076274
Patent Literature 2: JP-A 2006-53601

SUMMARY OF THE INVENTION

Problem(s) to be Solved by Invention

A first problem of the above recording scheme is that storage areas of an information record/reproduction apparatus cannot effectively be used. In actual management and observation of a satellite, a large amount of information that exceeds an expected one may be generated. As a result, a large amount of information may need to be recorded. Under those circumstances, if storage areas are managed with a pre-allocated constant size, a storage area for a certain category of information may overflow so that necessary information cannot be recorded. Alternatively, necessary information may be overwritten with newly input information before the reproduction. Meanwhile, a storage area for another category of information may have a free space. Specifically, in the aforementioned recording scheme, all of storage areas are divided into areas having a physically fixed size, and information of the same priority is recorded into each of the areas. Therefore, even if information is of a high priority, it cannot be recorded with a size greater than the predetermined size of an area into which the information is to be recorded. On the other hand, if information of a low priority has a size less than initially expected, a free space is present in an area into which the information is to be recorded. However, such a free storage area cannot be used effectively.

A second problem of the above recording scheme is that recording or reproduction needs to be stopped for specifying the size of storage areas in order to change allocation of areas having a fixed size. Therefore, with the above recording scheme, necessary steps should be performed after all recorded information that has not been reproduced is reproduced or past recorded information is discarded. In this case, it may take time to record necessary information. Recording may not be ready upon production of target information, and necessary information may not be recorded. In order to effectively use all storage area so as to eliminate those problems, the entire physical medium may be managed as a whole without allocation of areas having a fixed size to types of information to be recorded. With such management, no problems arise if the time when information to be recorded is produced and the amount of information are known beforehand. However, if an unexpected event occurs, an area into which the information has been recorded cannot be identified so that all recorded physical areas need to be reproduced for confirmation. Accordingly, retrieval and confirmation of information after the reproduction requires complicated steps and may cause an error. As a result, if any event that exceeds an expected range occurs, the possibility of loss of necessary information increases.

A third problem of the above recording scheme is that storage areas may be occupied with information of a low priority so that information of a high priority cannot be recorded with a required size. If the category of information to be recorded and the capacity of the storage area are prefixed, selection should be made between not recording newly input part of information of a high priority and overwriting old information with newly input information of a high priority. In this case, information of a low priority that is less significant to be reproduced may not be deleted and may be held continuously, and information of a high priority may be lost.

In view of the above problems, an object of the present invention is to provide an information record/reproduction apparatus intended to use a storage area efficiently and to record information of a high priority with minimized loss.

An object of the present invention is also to provide an information record/reproduction method suitable for the aforementioned information record/reproduction apparatus.

Means for Solving the Problem(s)

According to an aspect of the present invention, there is provided an information record/reproduction apparatus including logical volumes that can be used as a variable-length record/reproduction area and a physical volume that has been divided into a plurality of fixed-length areas and is not subjected to record or reproduction. Storage areas are managed by a management unit provided within or outside of the apparatus. In the information record/reproduction apparatus, allocation to the logical volume is made by combining the divided fixed-length physical volumes by the management unit, and the size of the information storage area can be set depending upon a category of information to be recorded. The category is defined by a priority. If the amount of information of high priority that is to be recorded exceeds a size of a predetermined logical volume corresponding to the information while no unused physical volume is available, then the management unit detaches part of the logical volume in which information of low priority has been recorded, allocates the detached part to the logical volume corresponding to the information, and thus records the exceeding amount of information.

According to another aspect of the present invention, there is provided an information record/reproduction method for an information record/reproduction apparatus including logical volumes that can be used as a variable-length record/reproduction area and a physical volume that has been divided into a plurality of fixed-length areas and is not subjected to record or reproduction. In this method, a corresponding number of logical volumes to the number of categories of information to be recorded are ensured, and the categories are defined by a priority. In this method, the fixed-length physical volume that has been divided is allocated to each of the logical volumes depending upon a priority of information to be recorded such that a size of an information storage area in the logical volume can dynamically be set. In this method, if the amount of information of a high priority that is to be recorded exceeds a size of a predetermined logical volume corresponding to the information while no unused physical volume is available, part of a logical volume in which information of a low priority has been recorded is detached and allocated to the logical volume corresponding to the information, and the exceeding amount of information is thus recorded.

Advantageous Effects of Invention

According to the present invention, there can be provided an information record/reproduction apparatus and an information record/reproduction method that can efficiently use storage areas, can record information of high priority with minimized loss, and is suitable for use in an artificial satellite.

MODE(S) FOR CARRYING OUT THE INVENTION

According to an information record/reproduction apparatus and an information record/reproduction method of the present invention, the size of information storage areas can dynamically be set depending upon the type of information to be recorded, for example, in an information record/reproduction apparatus provided in an artificial satellite, thereby setting storage areas depending upon the category of the information.

According to an information record/reproduction apparatus and an information record/reproduction method of the present invention, when information of a high priority needs to be newly recorded in a state in which information has been recorded in all storage areas of the information record/reproduction apparatus, information of a category of a low priority is automatically overwritten with information of a category of a high priority that is to be newly recorded. Thus, information of a high priority is recorded in full.

Embodiments of the present invention will be described below with reference to FIGS. 1 to 4.

Configuration of the Embodiment

Figure 1:
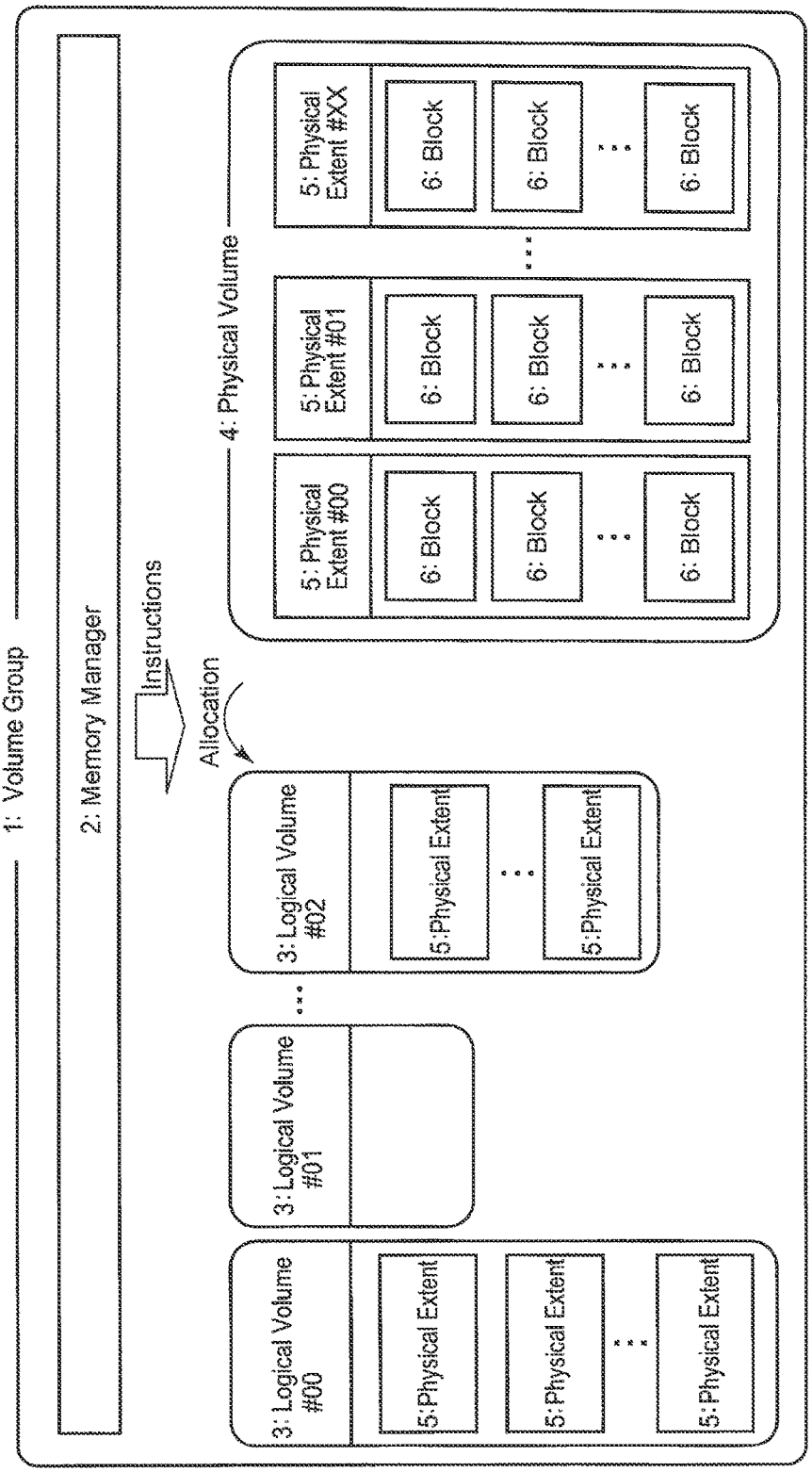
FIG. 1 is a diagram explanatory of a storage area management image by an information record/reproduction apparatus according to an embodiment of the present invention.

FIG. 1 illustrates a storage area management image according to a first embodiment of the present invention. An information record/reproduction apparatus of the present embodiment includes a memory manager (management means) 2, variable-length logical volumes 3 being used, and a physical volume 4 including physical extents 5 as unused storage areas into which a space is divided by a fixed length. A volume group 1 is used as a unit to identify, as a one group, the specific memory manager 2, the logical volumes 3 managed by the memory manager 2, and the physical volume 4 managed by the memory manager 2.

The logical volumes 3 (#00, #01, . . . , #02) are components of the volume group 1 and are system spaces in which the size of record/reproduction areas and allocation of categories of information to be recorded can dynamically be set. Specifically, each of the logical volumes 3 has the following features:

(1) The logical volume 3 is variable in length.

(2) The size of the logical volume 3 is automatically increased or decreased as needed and may be zero.

(3) The size of the logical volumes 3 is set with a unit of the physical extent 5.

(4) Physical extents 5 are allocated to each of the logical volumes 3.

The physical volume 4 is a physical medium for record/reproduction areas to form the volume group 1. Each of the physical extents 5 (#00, #01, . . . , #XX) is a component of the physical volume 4 and is a unit of a physical area used by the memory manager 2 to allocate an unused record/reproduction area to the logical volume 3. Although the physical extent 5 is variable in size, the size of the physical extent 5 cannot be changed during a record/reproduction operation so that the physical extent 5 is handled as having a fixed size. Each of the physical extents 5 includes fixed size blocks 6, each of which is a minimum unit for information management. Specifically, each of the physical extents 5 has the following features:

(1) Although the physical extent 5 is variable in length, it is handled as having a fixed length during a record/reproduction operation.

(2) Although the physical extent 5 is variable in size, the size of the physical extent 5 cannot be changed during the operation.

(3) Blocks 6 are sequentially allocated to the physical extent 5 in ascending order.

Each of the blocks 6 has a feature that it has a fixed length.

Figure 2:
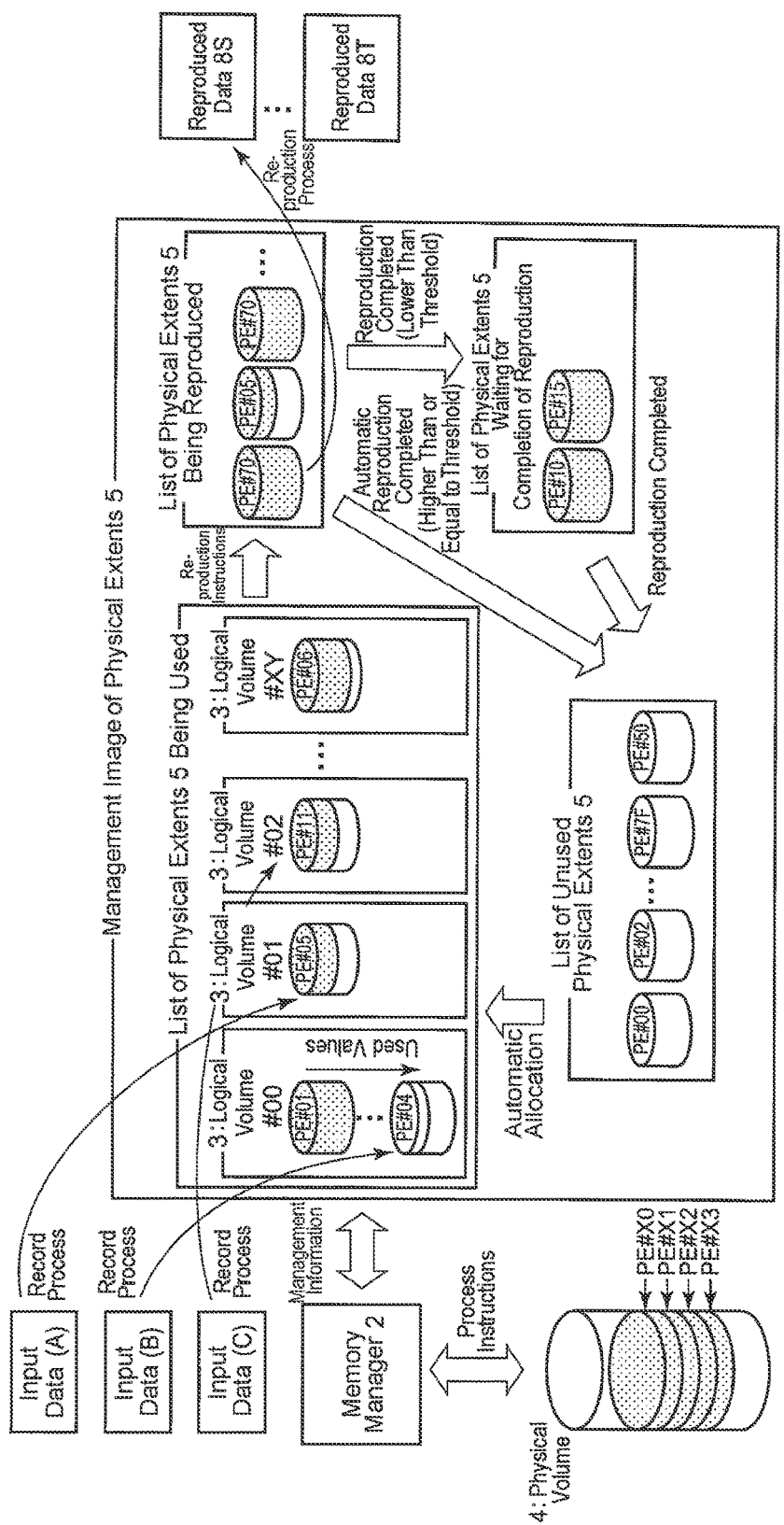
FIG. 2 is a diagram explanatory of a record/reproduction management image by a memory manager shown in FIG. 1.

FIG. 2 illustrates a record/reproduction management image (physical extent management age) by the memory manager 2 shown in FIG. 1. For example, the states of the physical extents 5 include "unused," "used," "reproducing," and "waiting for completion of reproduction."

The memory manager 2 reads and sets management information of the physical extents 5 in the physical volume 4 to grasp the states of all of the physical extents 5 and then issues process instructions for the physical volume 4. The memory manager 2 determines the number of the logical volume 3 that corresponds to the category (priority in this example) added to information inputted with packets (input information) and performs a record process to the logical volume 3 having the number corresponding to the information. The category of the information being inputted corresponds to the number of the logical volume 3 in a one-to-one relationship. After the memory manager 2 has determined the logical volume 3 into which information corresponding to one category is to be recorded, it confirms the capacity of a free area of the logical volume 3 into which the information is to be recorded. If the free area of that logical volume 3 is insufficient, one physical extent 5 is added to this logical volume 3. In other words, the size of the storage area of the logical volume 3 having the number corresponding to the category of the input information can dynamically be changed depending upon the category of the input information by allocating a physical extent 5 as a physical area to that logical volume as needed. Thus, the record/reproduction areas included in the volume group 1 can effectively be utilized.

The memory manager 2 can detach a required number of physical extents 5 from a logical volume 3 corresponding to a category of a low priority to allocate the detached physical extents 5 to the logical volume 3 having the number corresponding to the input information to which a category of a high priority has been added. Thus, information of a low priority that has been recorded in the detached physical extents 5 is overwritten with new information of a high priority to which a category corresponding to the logical volume 3 has been added.

Operation in the Embodiment

Now an operation of the volume group 1 shown in FIG. 1 will be described with reference to FIG. 3.

The memory manager 2 secures the number of the logical volumes 3 depending upon a required number of categories in an initial state and maps the number of each of the logical volumes 3 to the corresponding category in a one-to-one relationship. In this embodiment, the memory manager 2 divides categories into two groups and sets a category threshold between the two groups. The memory manager 2 divides the physical volume 4 into a required number of fixed-length physical extents 5 with a predetermined size and makes them unused ((a) Initialization of FIG. 3).

Before starting to record, the memory manager 2 automatically allocates an unused physical extent 5 to each of the logical volumes 3 one by one. The memory manager 2 divides categories into a category of a high priority and a category of a low priority and sets a threshold (i.e., a threshold relating to the priority) between the groups ((b) Recording Initialization of FIG. 3).

Once recording starts, the memory manager 2 confirms the type of input information and determines an area of the logical volume 3 into which the information is to be recorded. The memory manager 2 confirms the size of each of the logical volumes 3. If one logical volume 3 reaches an upper limit of the recording capacity so that the logical volume 3 is short of the storage area, then the memory manager 2 automatically allocates an unused physical extent 5 of the physical extents 5 in the physical volume 4 newly to that logical volume 3 one by one and continues to record ((c) Recording Operation of FIG. 3). The process of allocating an unused physical extent 5 to the logical volume 3 is continued until no more unused physical extents 5 are available.

Figure 3:
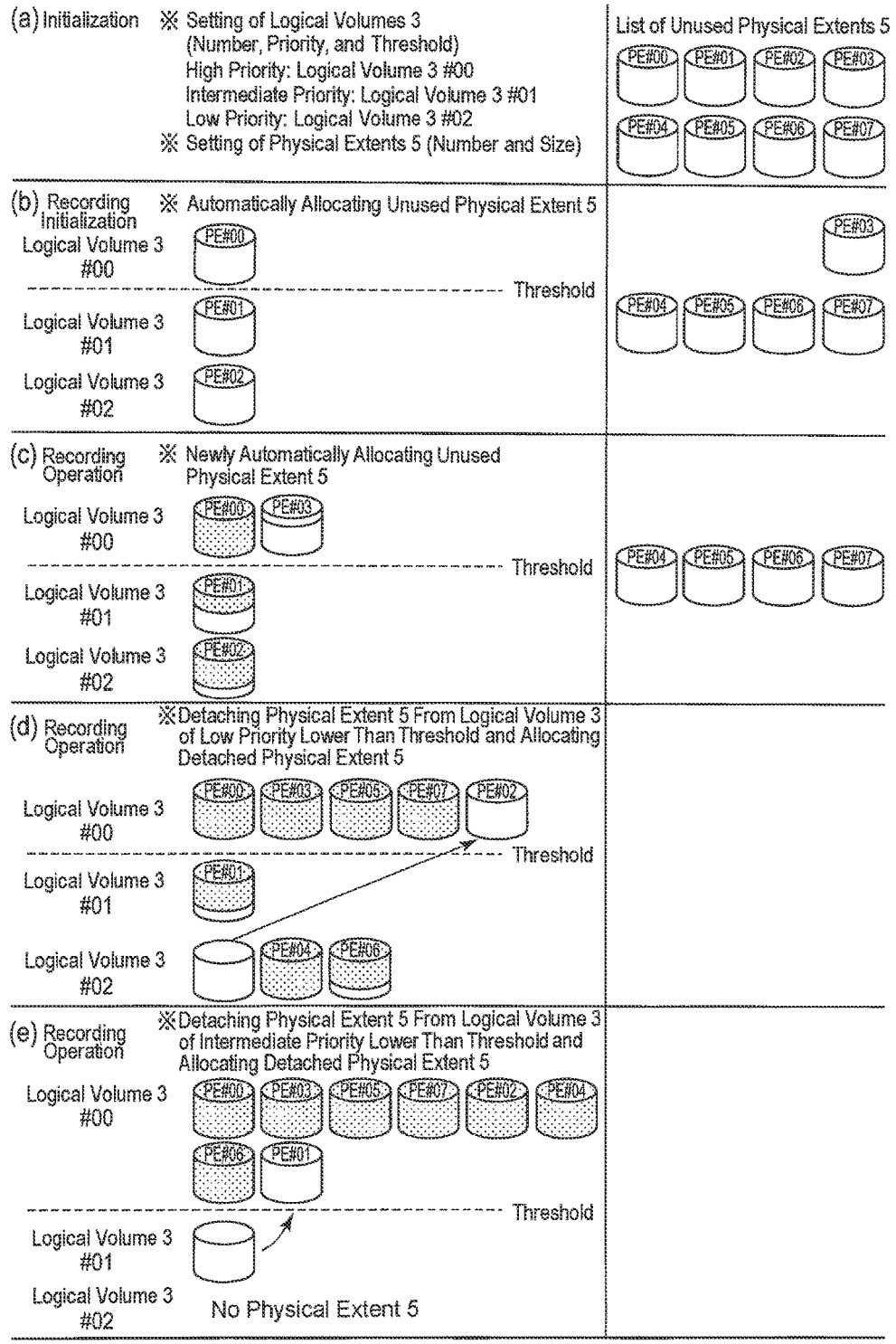
FIG. 3 is a diagram explanatory of an operation of a volume group shown in FIG. 1.
Figure 4:
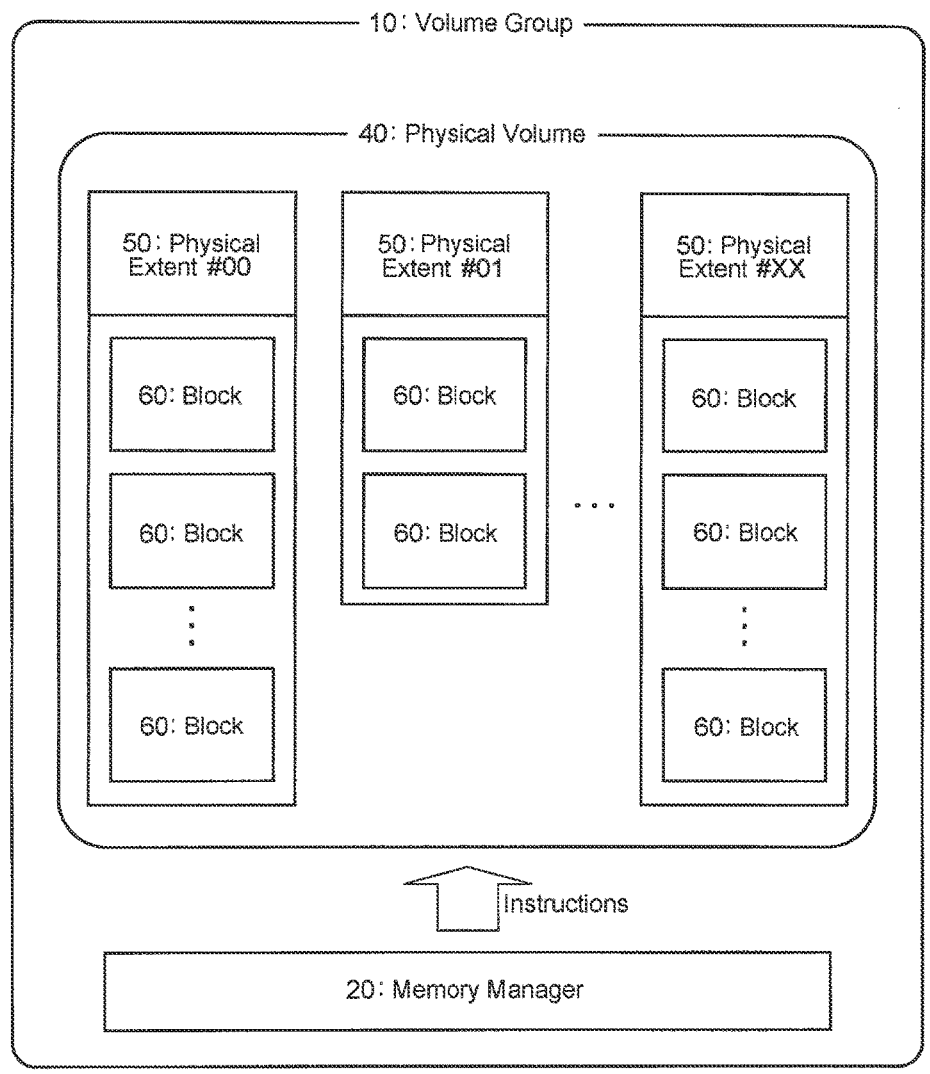
FIG. 4 is a diagram explanatory of a recording scheme of an existing information record/reproduction apparatus provided in a scientific satellite.

If information recorded into one logical volume 3 reaches an upper limit of the recording capacity without any unused physical extent 5 while the recording of the information continues, then the memory manager 2 detaches one physical extent 5 from a logical volume 3 having the category number corresponding to the priority lower than the threshold one by one and allocates the detached physical extent 5 to the logical volume 3 ((d) Recording Operation of FIG. 3). When one physical extent 5 is to be detached from a logical volume 3 of a category corresponding to a low priority, a physical extent 5 storing the oldest information or a physical extent 5 storing the latest information can be selected to be detached. The process of detaching one physical extent 5 from a logical volume 3 having the category number corresponding to the priority lower than the threshold set between the category groups and allocating the detached physical extent 5 to the logical volume 3 while information of a category of a high priority continues to be recorded is continued until no more logical volumes 3 corresponding to the category number corresponding to the priority lower than the threshold are available.

Advantageous Effects of the Embodiment

The following advantageous effects can be obtained by the information record/reproduction apparatus according to the first embodiment.

A first advantageous effect is that a storage area can efficiently be used. When a physical extent 5 included in a physical volume 4 is allocated to a logical volume 3, the size of a storage area can dynamically be changed depending upon the amount of information to be recorded because the size of the logical volume 3 is variable in length. Furthermore, an operation of allocating an unused physical extent 5 to a logical volume 3 is performed depending upon the amount of information being inputted.

A second advantageous effect is that information of a high priority can continuously be recorded even if no free space is available in storage areas. If the logical volume 3 having the number corresponding to a category of a high priority becomes short of the recording capacity, then a recorded physical extent 5 is detached one by one from a logical volume 3 having the number corresponding to a category lower than a threshold and allocated to the logical volume 3 that is short of the recording capacity. Thus, recorded information of a low priority can be overwritten with information of a high priority.

Other Embodiments

Now other embodiments of the present invention will be described.

Referring to FIG. 1, the memory manager 2 forms the volume group 1 along with the logical volumes 3 and the physical volume 4. However, the volume group 1 does not need to be implemented in one information record/reproduction apparatus and may be implemented across a plurality of information record/reproduction apparatuses. For example, the memory manager does not need to be provided within the information record/reproduction apparatus and may be implemented in an apparatus provided outside of the information record/reproduction apparatus so as to manage the information record/reproduction apparatus. Furthermore, the memory manager may be implemented not only by hardware for control, but also by software for control.

In FIG. 3, when the amount of information recorded in a logical volume 3 having the number corresponding to input information to which a category of a high priority has been added has reached an upper limit of the recording capacity, then one physical extent 5 is detached from a logical volume 3 having the number corresponding to the input information to which a category of a low priority has been added and is allocated to the logical volume 3 having the number corresponding to the category of a high priority. For this allocation, a physical extent 5 in which the oldest information has been recorded among the logical volumes 3 having the number corresponding to the category of a low priority may be detached. Alternatively, a physical extent 5 in which the latest information has been recorded may be detached.

INDUSTRIAL APPLICABILITY

The present invention is suitable for use in providing an information record/reproduction apparatus in an artificial satellite, categorizing information acquired on an orbit of the artificial satellite with a priority or the like, and transmitting information of a high priority to a terrestrial station with minimized loss.

This application claims the benefit of priority from Japanese patent application No. 2012-284142, filed on Dec. 27, 2012, the disclosure of which is incorporated herein in its entirety by reference.

DESCRIPTION OF REFERENCE NUMERALS AND SIGNS 1 volume group
2 memory manager

The invention claimed is:

1. An information record/reproduction apparatus including logical volumes that can be used as a variable-length record/reproduction area and a physical volume that has been divided into a plurality of fixed-length areas and is not subjected to record or reproduction, storage areas being managed by management means provided within or outside of the apparatus, wherein:
the physical volume that has been divided into the plurality of fixed-length areas and is not subjected to record or reproduction includes a plurality of physical extents that are unused storage areas divided with a fixed length,
the management means allocates a physical extent among the plurality of physical extents to a logical volume depending upon a category of information to be recorded such that the size of the logical volume is variable with a unit of the physical extent, and
the category of information is defined by a priority, and if an amount of information of a high priority that is to be recorded exceeds a size of a predetermined logical volume corresponding to the information while no unused physical volume that is not allocated to any logical volumes is available, then the management means detaches part of the logical volume in which information of a low priority has been recorded, allocates the detached part to the logical volume corresponding to the information of the high priority, and thus overwrites the information of the low priority with the exceeding amount of information,
wherein the management means divides the logical volumes into a first group having a category with a priority higher than a predetermined threshold and a second group having a plurality of categories with other priorities, and the detachment of the logical volume is carried out from a logical volume of the second group with a unit of the physical extent.

2. An information record/reproduction method for an information record/reproduction apparatus including logical volumes that can be used as a variable-length record/reproduction area and a physical volume that has been divided into a plurality of fixed-length areas and is not subjected to record or reproduction, comprising:
performing initialization to ensure the number of logical volumes depends upon a required number of categories and to map each of the logical volumes to a corresponding category of information in a one-to-one relationship;
defining the categories of information by a priority;
defining, in the physical volume that has been divided into the plurality of fixed-length areas and is not subjected to record or reproduction, a plurality of physical extents that are unused storage areas divided with a fixed length;
allocating a physical extent among the plurality of physical extents to a logical volume depending upon the priority of information to be recorded such that the size of the logical volume is variable with a unit of the physical extent;
if the amount of information of a high priority that is to be recorded exceeds a size of a predetermined logical volume corresponding to the information while no unused physical volume that is not allocated to any logical volumes is available, detaching part of a logical volume in which information of a low priority has been recorded, allocating the detached part to the logical volume corresponding to the information of the high priority, and thus overwriting the information of the low priority with the exceeding amount of information; and
dividing the logical volumes into a first group having a category with a priority higher than a predetermined threshold and a second group having a plurality of categories with other priorities, and carrying out the detachment of the logical volume from a logical volume of the second group with a unit of the physical extent.

3. The information record/reproduction method as recited in claim 2, wherein the logical volumes that can be used as a variable-length record/reproduction area and the physical volume that has been divided into a plurality of fixed-length areas and is not subjected to record or reproduction are implemented across a plurality of information record/reproduction apparatuses.

* * * * *